United States Patent
Hunter et al.

(12) United States Patent (10) Patent No.: US 9,243,743 B2
(45) Date of Patent: Jan. 26, 2016

(54) SUPPORT ARM (71) Applicant: ICWUSA.COM, INC., Medford, OR (US)

(72) Inventors: Duncan James Hunter, Medford, OR (US); Mark Erskine, Medford, OR (US)

(73) Assignee: ICWUSA.COM, INC., Medford, OR (US)

(*) Notice: Subject to any disclaimer, the term of this patent is extended or adjusted under 35 U.S.C. 154(b) by 148 days.

(21) Appl. No.: 13/781,943

(22) Filed: Mar. 1, 2013

(65) Prior Publication Data

US 2014/0246552 A1 Sep. 4, 2014

(51) Int. Cl.
E04G 3/00 (2006.01)
F16M 13/02 (2006.01)
F16M 11/04 (2006.01)
F16M 11/20 (2006.01)

(52) U.S. Cl.
CPC .............. F16M 13/02 (2013.01); F16M 11/041 (2013.01); F16M 11/046 (2013.01); F16M 11/048 (2013.01); F16M 11/2014 (2013.01); F16M 2200/022 (2013.01); F16M 2200/041 (2013.01)

(58) Field of Classification Search
USPC .......... 248/274.1, 276.1, 278.1, 284.1, 291.1, 248/292.12, 280.11
See application file for complete search history.

(56) References Cited

U.S. PATENT DOCUMENTS

| | | | | |
|---|---|---|---|---|
| 4,686,664 A | * | 8/1987 | Graham | G11B 3/14 33/613 |
| 4,728,247 A | * | 3/1988 | Nakashima et al. | 414/680 |
| 5,037,053 A | * | 8/1991 | Fox et al. | 248/280.11 |
| 5,192,963 A | | 3/1993 | Hill | |
| 5,743,503 A | * | 4/1998 | Voeller et al. | 248/284.1 |
| 5,799,917 A | * | 9/1998 | Li | 248/284.1 |
| 5,975,472 A | * | 11/1999 | Hung | 248/278.1 |
| 6,227,508 B1 | * | 5/2001 | Panzarella et al. | 248/276.1 |
| 6,378,829 B1 | | 4/2002 | Strater et al. | |
| 7,562,852 B2 | | 7/2009 | Wang | |
| 7,677,515 B2 | * | 3/2010 | Oddsen et al. | 248/274.1 |
| RE43,806 E | * | 11/2012 | Carnevali | 248/181.1 |
| 8,328,151 B2 | * | 12/2012 | Gwag | 248/284.1 |
| 8,899,540 B2 | * | 12/2014 | Honsberger et al. | 248/281.11 |
| 2004/0084587 A1 | | 5/2004 | Oddsen | 248/284.1 |
| 2004/0124328 A1 | | 7/2004 | Cvek | |
| 2005/0224670 A1 | * | 10/2005 | Metelski | 248/280.11 |
| 2006/0102819 A1 | * | 5/2006 | Li | 248/280.11 |
| 2007/0040084 A1 | * | 2/2007 | Sturman et al. | 248/280.11 |
| 2007/0095992 A1 | * | 5/2007 | Dozier | 248/276.1 |

(Continued)

Primary Examiner — Terrell McKinnon
Assistant Examiner — Michael McDuffie
(74) Attorney, Agent, or Firm — Jerry Haynes Law (57) ABSTRACT A support arm includes a generally elongated support arm housing having first and second ends; an arm mounting member pivotally carried by the first end of the support arm housing, the arm mounting member pivotal throughout a first range of rotation; a device mounting member pivotally carried by the second end of the support arm housing, the device mounting member pivotal throughout a second range of rotation; a position equalizing assembly engaging the arm mounting member and the device mounting member, the position equalizing assembly pivoting the arm mounting member and the device mounting member in opposite directions throughout the first range of rotation and the second range of rotation; and a counterbalance adjusting assembly carried by the arm mounting member and engaging the device mounting member, the counterbalance adjusting assembly applying counterbalance force to the device mounting member.

13 Claims, 8 Drawing Sheets

(56) References Cited

U.S. PATENT DOCUMENTS

| | | |
|---|---|---|
| 2007/0102607 A1* | 5/2007 | Koh .................... 248/276.1 |
| 2007/0108355 A1 | 5/2007 | Li |
| 2007/0187562 A1 | 8/2007 | Gaida et al. |
| 2008/0029670 A1* | 2/2008 | Hung .................... 248/278.1 |
| 2009/0008524 A1* | 1/2009 | Huang et al. ............ 248/278.1 |
| 2010/0006727 A1 | 1/2010 | Bommgaarden et al. |
| 2011/0315843 A1* | 12/2011 | Hung .................... 248/279.1 |
| 2012/0153117 A1 | 6/2012 | Bowman et al. |
| 2012/0267497 A1 | 10/2012 | Bowman et al. |

* cited by examiner

SUPPORT ARM

FIELD OF THE INVENTION

Illustrative embodiments of the disclosure generally relate to apparatuses for supporting devices such as computers, monitors, keyboards, laptops and the like. More particularly, illustrative embodiments of the disclosure relate to a support arm which can be used to support a device relative to a fixed surface and allows controlled freedom of movement of the device.

BACKGROUND OF THE INVENTION

Medical and dental offices may utilize devices such as computers, monitors, keyboards, laptop computers and the like to store medical or dental records and treatment protocols for patients. It may be desirable that these devices be adjustable in position for the benefit of a physician, dentist, assistant or other personnel as he or she attends to the patient. However, these devices are frequently mounted in a fixed position on a desk, countertop or other surface. Access to the device may require that the personnel either remain sitting and assume an uncomfortable position or move from the patient to the device to retrieve the necessary information and then return to the patient.

Therefore, a support arm which can be used to support a device relative to a fixed surface and allows controlled freedom of movement of the device may be desirable for medical, dental or other applications.

SUMMARY OF THE INVENTION

Illustrative embodiments of the disclosure are generally directed to a support arm. An illustrative embodiment of the support arm includes a generally elongated support arm housing having first and second ends; an arm mounting member pivotally carried by the first end of the support arm housing, the arm mounting member pivotal throughout a first range of rotation; a device mounting member pivotally carried by the second end of the support arm housing, the device mounting member pivotal throughout a second range of rotation; a position equalizing assembly engaging the arm mounting member and the device mounting member, the position equalizing assembly pivoting the arm mounting member and the device mounting member in opposite directions throughout the first range of rotation and the second range of rotation; and a counterbalance adjusting assembly carried by the arm mounting member and engaging the device mounting member, the counterbalance adjusting assembly applying counterbalance force to the device mounting member.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 2:
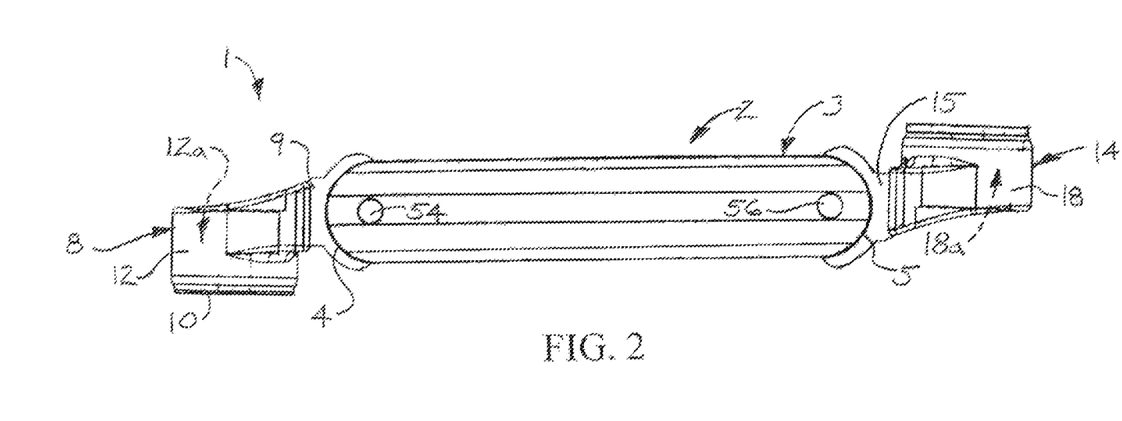
FIG. 2 is a side view of an illustrative support arm.
Figure 3:
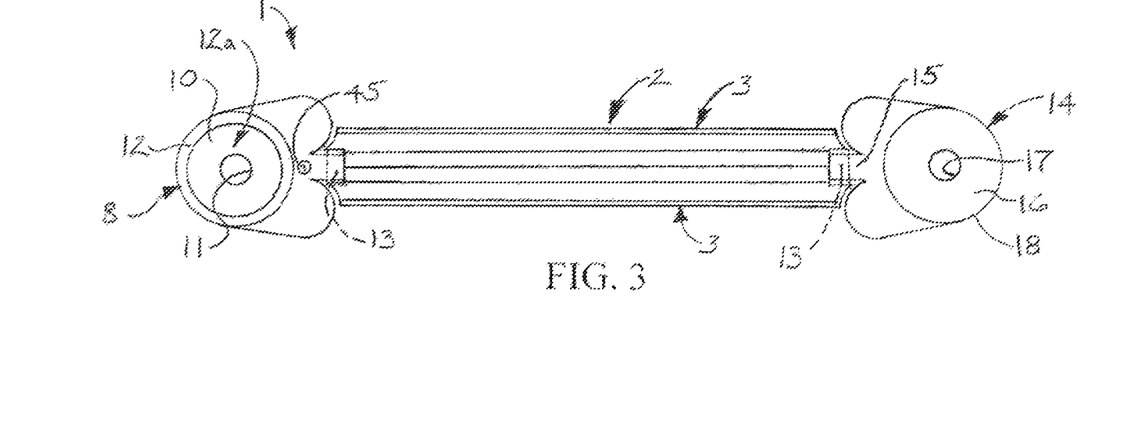
FIG. 3 is a top view of an illustrative support arm.
Figures 3A, 3B:
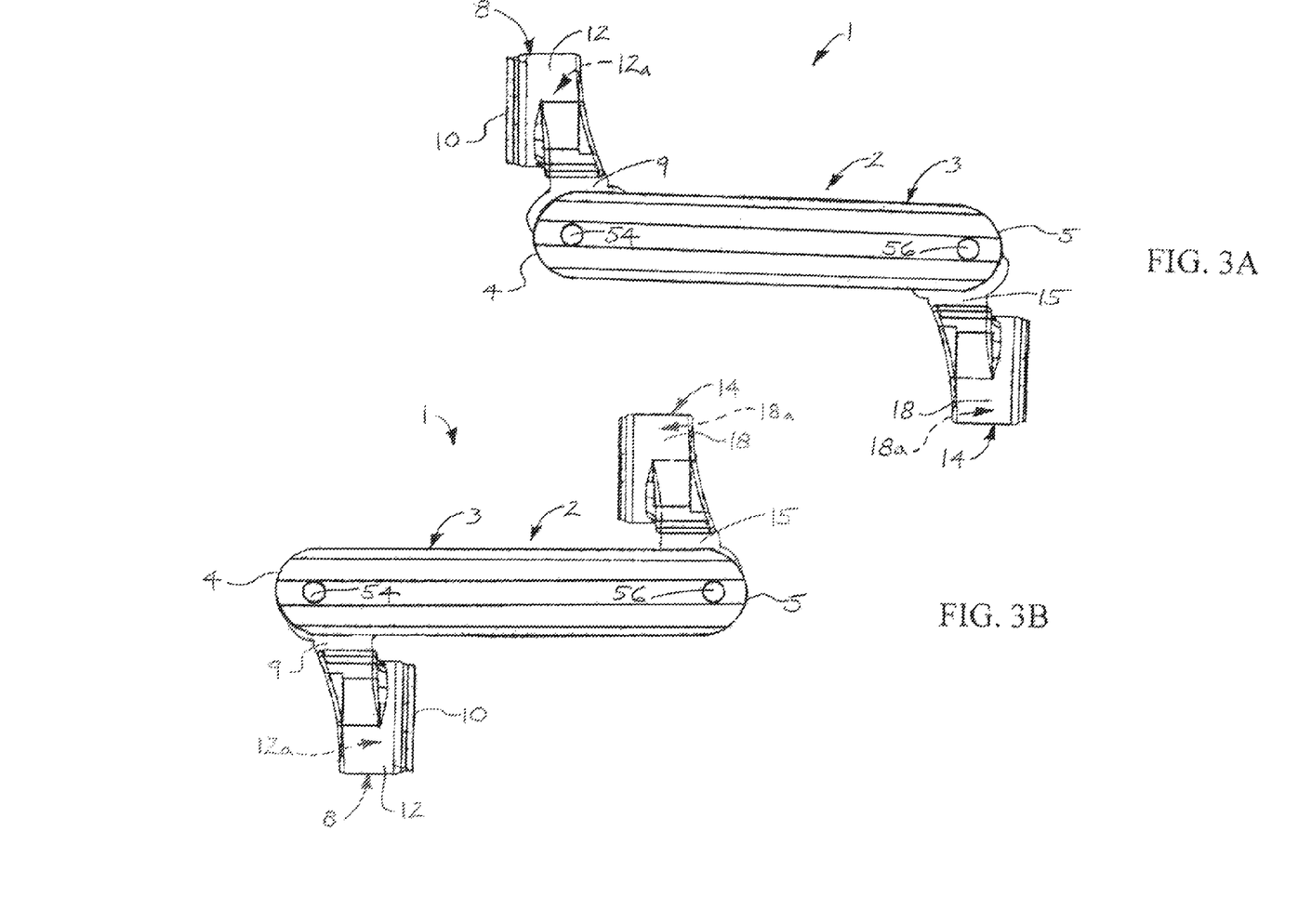
FIGS. 3A and 3B are side views illustrating an exemplary range of movement of the arm mounting member and the device mounting member relative to each other.
Figure 4:
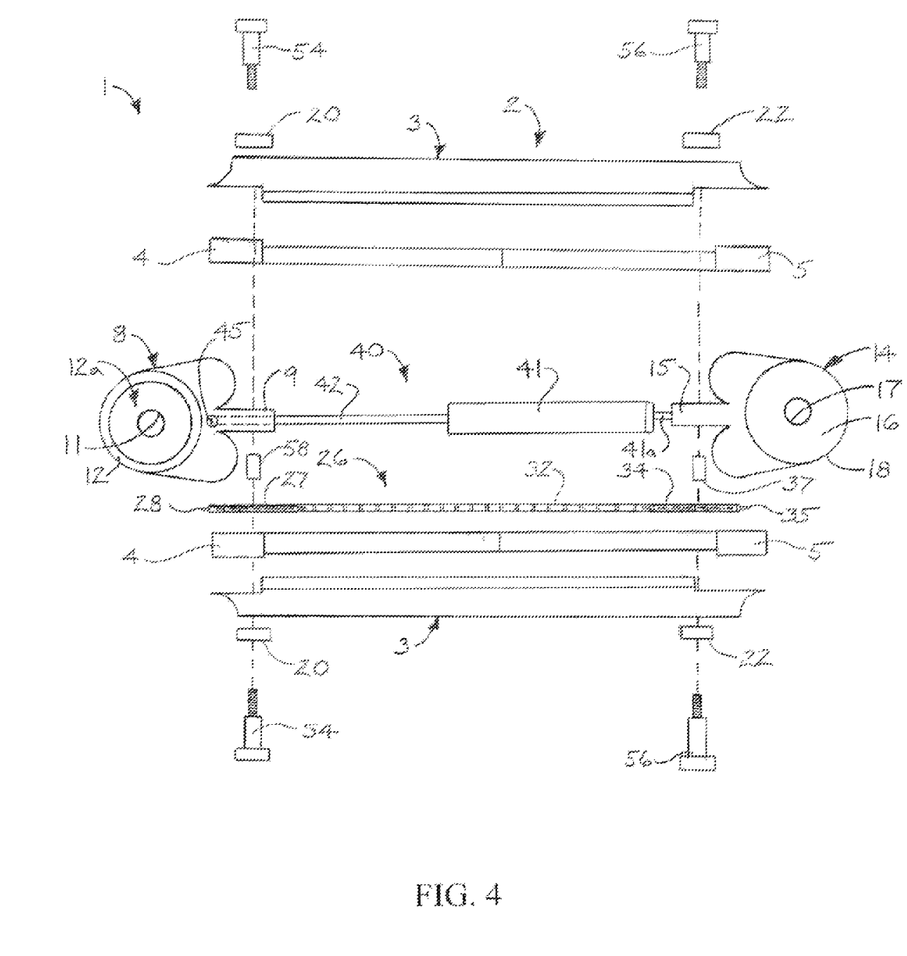
FIG. 4 is an exploded top view of an illustrative support arm.
Figure 5:
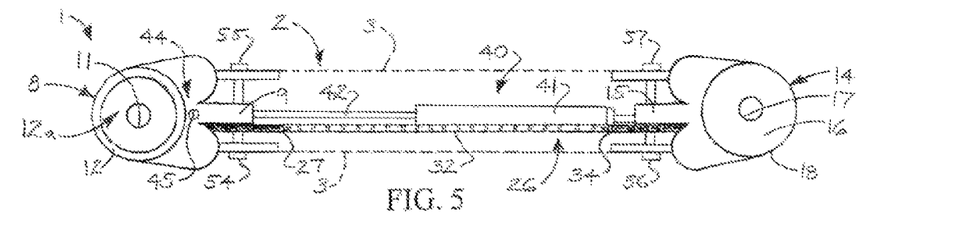
FIG. 5 is a top view of an illustrative support arm, more particularly illustrating an exemplary position equalizing assembly and an exemplary counterbalance adjusting assembly contained in the support arm housing (in phantom) of the support arm and engaging the arm mounting member and the device mounting member.

Referring initially to FIGS. 1-8 of the drawings, an illustrative embodiment of the support arm is generally indicated by reference numeral 1. The support arm 1 may include a support arm housing 2. The support arm housing 2 may be generally elongated and may be plastic, a metal such as aluminum, a composite material and/or other material which is consistent with the functional requirements of the support arm 1. A pair of proximal end caps 4 and a pair of distal end caps 5 may be provided inside the support arm housing 2. As illustrated in FIG. 4, in some embodiments, the support arm housing 2 may include a pair of mating housing portions 3. The housing portions 3 of the support arm housing 2 may be attached to each other via mechanical fasteners such as a pair of proximal housing shoulder bolts 54 and a pair of distal housing shoulder bolts 56, as will be hereinafter further described. In some embodiments, the housing portions 3 may be attached to each other using glue or other adhesive or may be heat-sealed, molded or casted in one piece according to the knowledge of those skilled in the art.

Figure 1:
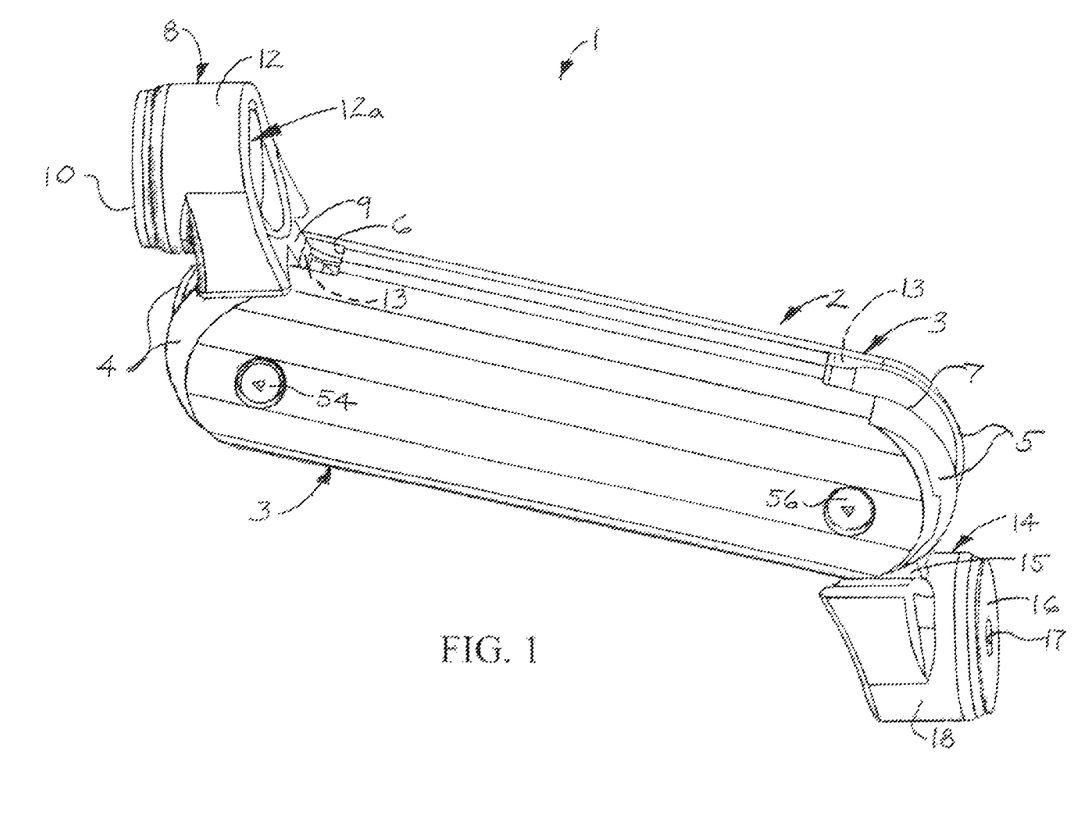
FIG. 1 is a perspective view of an illustrative embodiment of the support arm with a support arm housing and an arm mounting member and a device mounting member at opposite ends of the support arm housing.

As illustrated in FIG. 1, a proximal arm slot 6 and a distal arm slot 7 may be provided in the support arm housing 2 between the proximal end caps 4 and the distal end caps 5, respectively. A flexible slot cover strip 13 may cover the proximal arm slot 6 and the distal arm slot 7 for purposes which will be hereinafter described to prevent dust, dirt and other debris from entering the support arm housing 2 through the proximal arm slot 6 and the distal arm slot 7 and to eliminate pinch point.

Figure 10:
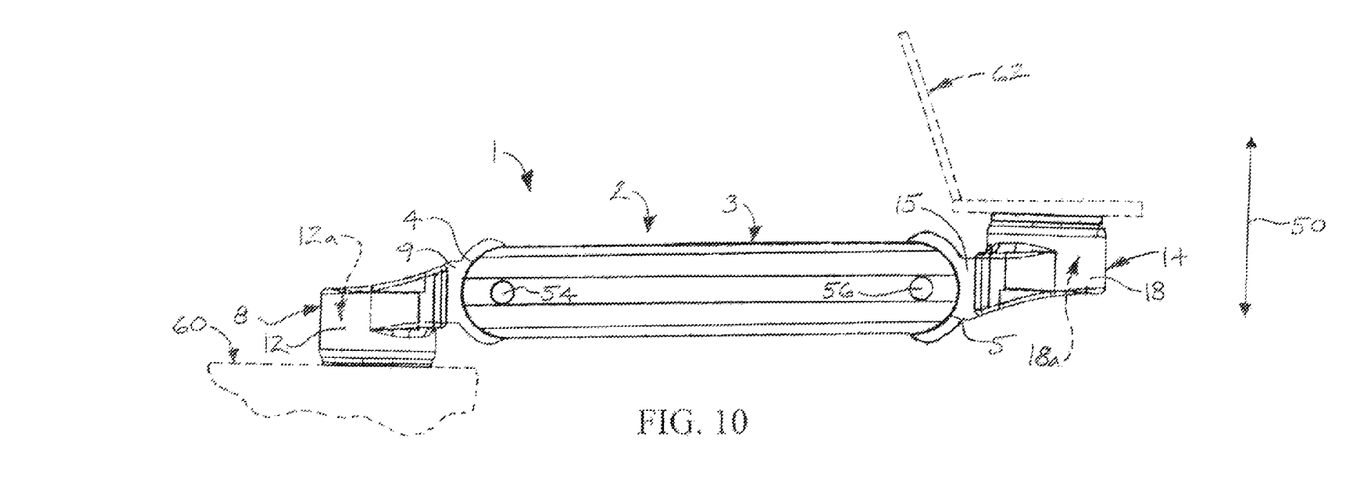
FIG. 10 is a side view of an illustrative support arm, with the arm mounting member attached to a support structure (in phantom) and a device (illustrated in phantom) supported by the device mounting member in exemplary application of the support arm, more particularly illustrating vertical positioning capability of the device mounting member.
Figure 11:
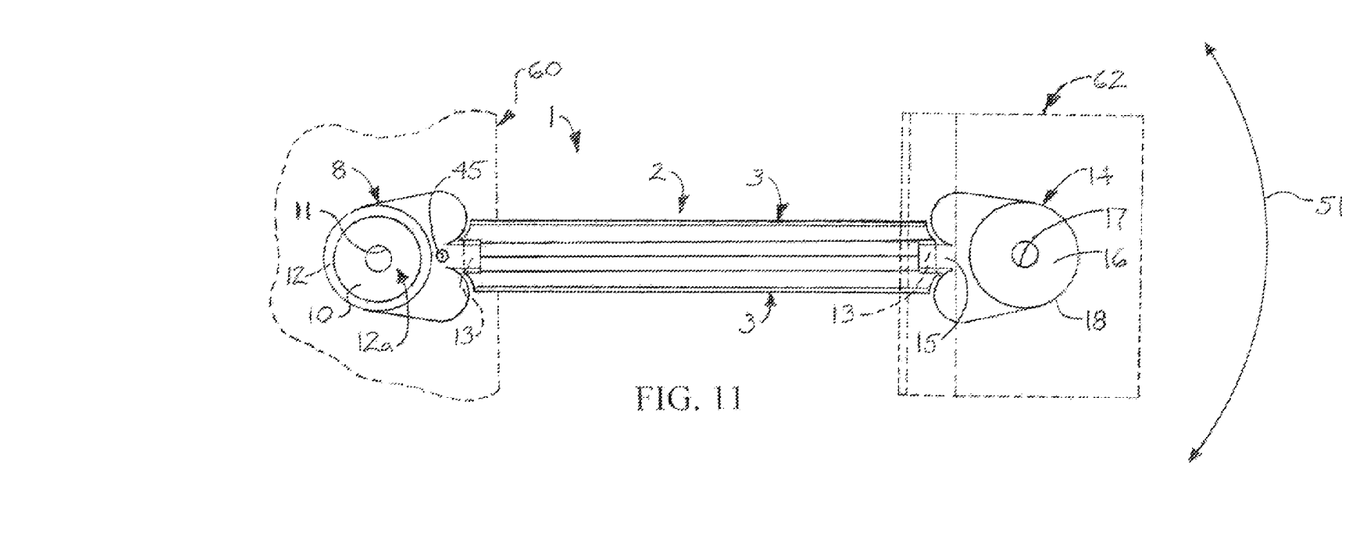
FIG. 11 is a top view of an illustrative support arm, with the arm mounting member attached to a support structure (in phantom) and a device (illustrated in phantom) supported by the device mounting member in exemplary application of the support arm, more particularly illustrating horizontal positioning capability of the device mounting member.

An arm mounting member 8 is pivotally mounted in the proximal arm slot 6 of the support arm housing 2. A device mounting member 14 is pivotally mounted in the distal arm slot 7 of the support arm housing 2. As will be hereinafter described, in exemplary application of the support arm 1, the arm mounting member 8 facilitates attachment of the support arm 1 to a support structure 60 (FIG. 10). The device mounting member 14 facilitates attachment of a device 62 (FIG. 10) to the support arm 1. The arm mounting member 8 facilitates selective movement of the support arm 1 and the device 62 within a vertical plane 50 (FIG. 10) and within a horizontal plane 51 (FIG. 11). The arm mounting member 8 may include a mounting member arm 9 which extends through the proximal arm slot 6. A mounting member wall 12 which may be cylindrical may terminate the mounting member arm 9 outside the support arm housing 2. The mounting member wall 12 forms a mounting member interior 12a. A mounting member bottom panel 10 may close the mounting member interior 12a. A mounting member bottom panel opening 11 which communicates with the mounting member interior 12a may extend through the mounting member bottom panel 10.

The device mounting member 14 may include a mounting member arm 15 which extends through the distal arm slot 7. A mounting member wall 18 which may be cylindrical may terminate the mounting member arm 15 outside the support arm housing 2. The mounting member wall 18 forms a mounting member interior 18a. A mounting member top panel 16 may close the mounting member interior 18a. A mounting member top panel opening 17 which communicates with the mounting member interior 18a may extend through the mounting member top panel 16. It will be recognized and understood that the arm mounting member 8 and the device mounting member 14 may have any alternative design which is suitable for attachment of the arm mounting member 8 to the support structure 60 (FIG. 10) and attachment of the device 62 to the device mounting member 14, respectively, according to the knowledge of those skilled in the art.

As illustrated in FIGS. 3A and 3B, the arm mounting member 8 and the device mounting member 14 may be positional throughout a 180-degree arc at the proximal end caps 4 and the distal end caps 5, respectively, of the support arm housing 2. A position equalizing assembly 26 (FIG. 4), which will be hereinafter described, may connect the arm mounting member 8 and the device mounting member 14 such that the arm mounting member 8 and the device mounting member 14 simultaneously pivot in opposite directions in the proximal arm slot 6 and the distal arm slot 7, respectively, of the support arm housing 2. Accordingly, when the arm mounting member 8 is deployed in a horizontal position, the device mounting member 14 may be likewise be deployed in the horizontal position as illustrated in FIG. 2. When the arm mounting member 8 is deployed in the upward vertical position, the device mounting member 14 may be deployed in the downward vertical position as illustrated in FIG. 3A. Conversely, when the arm mounting member 8 is deployed in the downward vertical position, the device mounting member 14 may be deployed in the upward vertical position as illustrated in FIG. 3B. Therefore, the plane of the arm mounting member 8 may remain in parallel relationship to the plane of the device mounting member 14 as the arm mounting member 8 and the device mounting member 14 are pivoted throughout their respective ranges of movement on opposite sides of the support arm housing 2.

As illustrated in FIG. 4, a pair of proximal ball bearing assemblies 20 may be provided between a pair of proximal housing shoulder bolts 64 and the respective housing portions 3 of the support arm housing 2. A pair of distal ball bearing assemblies 22 may be provided between a pair of distal housing shoulder bolts 56 and the respective housing portions 3 of the support arm housing 2. The outer races of the proximal ball bearing assemblies 20 and the distal ball bearing assemblies 22 may be fixedly attached to the respective housing portions 3 of the support arm housing 2 according to the knowledge of those skilled in the art. A pair of proximal housing shoulder bolt 54 may be extended through a pair of bolt openings (not illustrated) in the proximal ball bearing assemblies 20 and a pair of registering proximal bolt openings (not illustrated) in the respective housing portions 3, respectively, and the proximal end caps 4, respectively, and may be threaded in the mounting member arm 9 of the arm mounting member 8. A pair of distal housing shoulder bolts 56 may be extended through a pair of bolt openings (not illustrated in the distal ball bearing assemblies 22 and a pair of registering distal bolt openings (not illustrated) in the respective housing portions 3, respectively, and the distal end caps 5, respectively, and may be threaded in the mounting member arm 15 of the device mounting member 14. The mounting member arm 9 of the arm mounting member 8 may be attached in fixed relation to the proximal housing shoulder bolt 54 such that the proximal housing shoulder bolt 54 rotates with the mounting member arm 9. Likewise, the mounting member arm 15 of the device mounting member 14 may be attached in fixed relation to the distal housing shoulder bolt 56 such that the distal housing shoulder bolt 54 rotates with the mounting member arm 15. Accordingly, the proximal ball bearing assemblies 20 and the distal ball bearing assemblies 22 may facilitate smooth rotation of the proximal housing shoulder bolt 54 and the distal housing shoulder bolt 56, respectively, relative to the support arm housing 2 as the arm mounting member 8 and the device mounting member 14 are pivoted throughout their respective ranges of motion, as was heretofore described with respect to FIGS. 3A and 3B.

Figures 8, 9:
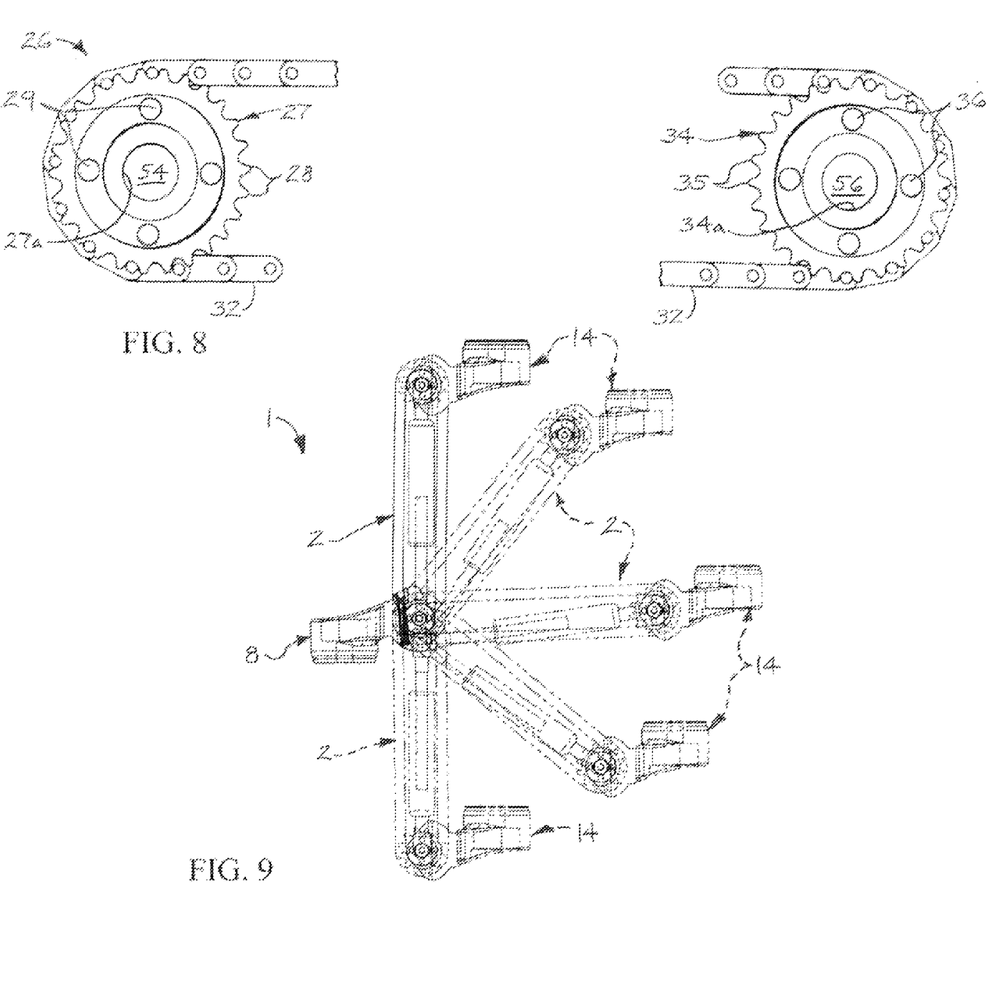
FIG. 8 is a side view, partially in section, of an exemplary position equalizing assembly.
FIG. 9 is a side view of an exemplary support arm, more particularly illustrating an exemplary range of motion of the support arm.

An exemplary position equalizing assembly 26 which is suitable for maintaining the plane of the arm mounting member 8 and the plane of the device mounting member 14 parallel to each other throughout the range of motion of each is illustrated in FIGS. 4 and 8. In some embodiments, the position equalizing assembly 26 may include a proximal sprocket 27 having a bolt opening 27a (FIG. 8), which accommodates the proximal housing bolt 54, and multiple circumferential proximal sprocket teeth 28. The proximal sprocket 27 may be attached to the mounting member arm 9 of the arm mounting member 8 via multiple mechanical fasteners 29 and/or other suitable attachment technique. The position equalizing assembly 26 may further include a distal sprocket 34 having a bolt opening 34a (FIG. 8), which accommodates the distal housing bolt 56, and multiple circumferential distal sprocket teeth 35. The distal sprocket 34 may be attached to the mounting member arm 15 of the device mounting member 14 via multiple mechanical fasteners 36 and/or other suitable attachment technique. A continuous chain 32 may be engaged by the proximal sprocket teeth 28 of the proximal sprocket 27 and the distal sprocket teeth 35 of the distal sprocket 34. Accordingly, upon counterclockwise rotation of the proximal sprocket 27, the chain 32 rotates the distal sprocket 34 in the counterclockwise direction. Conversely, upon clockwise rotation of the proximal sprocket 27, the chain 32 rotates the distal sprocket 34 in the clockwise direction. In other embodiments, the position equalizing assembly 26 may include proximal and distal pulleys (not illustrated) which are attached to the mounting member arm 9 of the arm mounting member 8 and the mounting member arm 15 of the device mounting member 14, respectively. An endless belt (not illustrated) may be trained around the proximal and distal pulleys to transmit rotation from the proximal pulley to the distal pulley and maintain the arm mounting member 8 and the device mounting member 14 in parallel planes.

Figure 6:
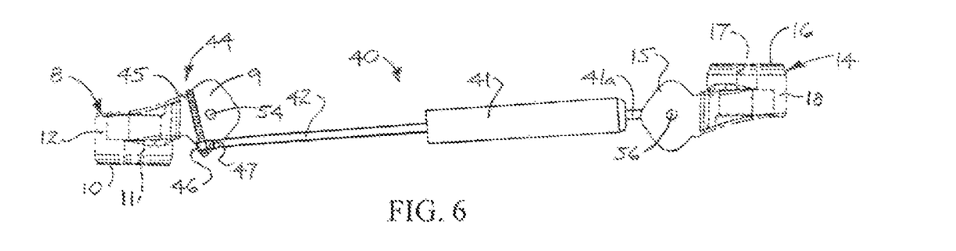
FIG. 6 is a side view of an exemplary counterbalance adjusting assembly, more particularly illustrating adjustment of the assembly to maximize counterbalance of the device mounting member.
Figure 7:
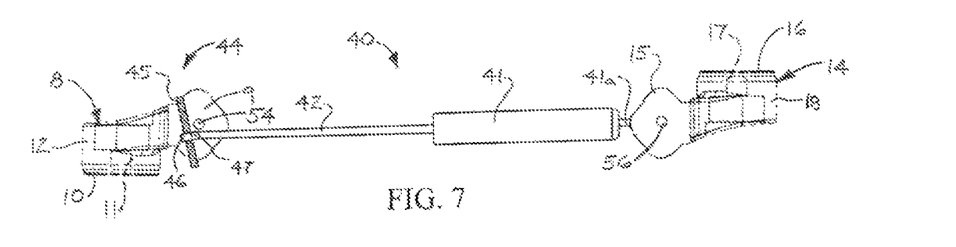
FIG. 7 is a side view of an exemplary counterbalance adjusting assembly, more particularly illustrating adjustment of the assembly to minimize counterbalance of the device mounting member.

As further illustrated in FIG. 4, a counterbalance adjusting assembly 40 may engage the arm mounting member 8 and the device mounting member 14 to selectively vary the magnitude of counterbalance force which is applied to the device mounting member 14. Increasing the counterbalance force which the counterbalance adjusting assembly 40 applies to the device mounting member 14 correspondingly increases the weight-bearing capacity of the device mounting member 14, as will be hereinafter described. In some embodiments, the counterbalance adjusting assembly 40 may include a gas spring cylinder 41. The cylinder 41 may be attached, such as via a cylinder attachment rod 41a and a dowel pin 37, to the horizontal pivot point of the mounting member arm 15 of the device mounting member 14 with respect to the distal housing bolt 56. A piston 42 extends from the cylinder 41. As illustrated in FIGS. 6 and 7, the piston 42 engages an assembly adjusting mechanism 44 which is provided in the mounting member arm 9. In some embodiments, the assembly adjusting mechanism 44 may include a threaded lead screw 45 which threadably engages a lead screw opening (not illustrated) in the mounting member arm 9 of the arm mounting member 8. A clevis nut 46 threadably engages the lead screw 45. A clevis 47 extends from the clevis nut 46. The piston 42 is pivotally attached to the clevis 47 such as via a dowel pin 58 (FIG. 4), typically in the conventional manner. Accordingly, the lead screw 45 can be selectively rotated in a first direction to thread the clevis nut 46 downwardly on the lead screw 45, as illustrated in FIG. 6, to increase the counterbalancing force which the cylinder 41 applies against the device mounting member 14 and thus, correspondingly increase the weight-bearing capacity of the device mounting member 14 depending on the weight of the device 62 on the device mounting member 14. Conversely, the lead screw 45 can be selectively rotated in a second direction to thread the clevis nut 46 upwardly on the lead screw 45, as illustrated in FIG. 7, such that the pivot point at the clevis 47 is generally coaxial with the pivot point of the mounting member arm 9 of the arm mounting member 8. This position of the clevis nut 46 on the lead screw 45 decreases the counterbalancing force which the cylinder 41 applies against the device mounting member 14 and correspondingly decreases the weight-bearing capacity of the device mounting member 14.

In other embodiments the counterbalance adjusting assembly 40 may include alternative devices which are capable of applying the counterbalancing force to the device mounting member 14 such as mechanical springs or servo motors (not illustrated) or the like.

The clevis nut 46 may be contoured to match the shape of the slot in the mounting member arm 9 (with clearance to allow the clevis nut 46 to slide when adjusted) such that the force of the gas spring cylinder 41 is transferred directly to the arm mounting member 8 rather than through the lead screw 45 (except at the extreme ends of travel of the clevis nut 46 near 0 degrees and 180 degrees of the support arm housing 2) and the lead screw 45 is column-loaded rather than side-loaded. This design may prevent the force of the gas spring cylinder 41 from damaging the lead screw 45 and the threads on the clevis nut 46.

Referring next to FIGS. 9-11 of the drawings, in exemplary application, the arm mounting member 8 of the support arm 1 is mounted on a fixed surface on the support structure 60. The support structure 60 may be a desktop, a countertop or any other structure or surface which is capable of safely and securely bearing the weight of the support arm 1 and the device 62 which is attached to the device mounting member 14. The device 62 may be a computer, monitor, keyboard, laptop or other electronic device which is to be rendered accessible for viewing and operation by a user (not illustrated). The arm mounting member 8 may be attached to the support structure 60 using any technique which is suitable for the purpose. In some applications, a mechanical fastener (not illustrated) which is suitable for the purpose may be extended through the mounting member bottom panel opening 11 (FIG. 11) in the mounting member bottom panel 10 of the arm mounting member 8. The fastener may be extended through a registering fastener opening (not illustrated) in the support structure 60 and anchored in the fastener opening using a nut (not illustrated) or the like. The device 62 may be attached to the device mounting member 14 using an attachment technique (not illustrated) which is suitable for the purpose such as one or more mechanical fasteners, an adhesive, a magnet, hook and loop fasteners and/or any other attachment technique which is suitable for the purpose and appropriate for the weight of the device 62.

It will be appreciated by those skilled in the art that the support arm 1 is capable of pivoting within a vertical plane 50 (FIG. 10) and a horizontal plane 51 (FIG. 11) to selectively adjust the height of the device 62 above a floor (not illustrated). A user (not illustrated) of the device 62 may sit in a chair or on a stool (not illustrated) next to the support structure 60 within sufficient proximity to the device 62 for the user to view and operate the device 62. The orientation of the support arm 1 within the vertical plane 50 and the horizontal plane 51 can be selected to position the device 62 according to the preferences of the user. As illustrated in FIG. 9, the support arm 1 can be deployed within the vertical plane 50 at any orientation in a 180-degree arc including a bottom vertical position, a top vertical position and any position in between. The position equalizing assembly 26 (FIG. 8) maintains the arm mounting member 8 and the device mounting member 14 in parallel planes throughout the range of movement of the support arm 1. This expedient maintains the device 62 at a horizontal orientation throughout the entire range of movement irrespective of the height of the device 62. Moreover, the counterbalancing force which the counterbalance adjusting assembly 40 applies to the mounting member arm 15 of the device mounting member 14 can be selected, by actuation of the assembly adjusting mechanism 44, to match the weight of the device 62 on the device mounting member 14. Adjustment of the clevis nut 46 (FIG. 6) downwardly on the lead screw 45 of the assembly adjusting mechanism 44 increases the counterbalancing force which the cylinder 41 of the counterbalance adjusting assembly 40 applies to the device mounting member 14, enabling the support arm 1 to support a relatively heavy device 62 at the desired height. Adjustment of the clevis nut 46 upwardly on the lead screw 45 decreases the counterbalancing force applied to the device mounting member 14 and enables the support arm 1 to support a relatively lightweight device 62 at the desired height.

It will be further appreciated by those skilled in the art that wiring (not illustrated) which trails from the device 62 to equipment (not illustrated) which is supported on or inside the support structure 60 can be extended along the support arm 1 and attached thereto using a suitable attachment technique (not illustrated) such as tape, clips or adhesive, for example and without limitation. Therefore, the support arm 1 prevents the wiring from becoming damaged or tangled during use.

Figure 12:
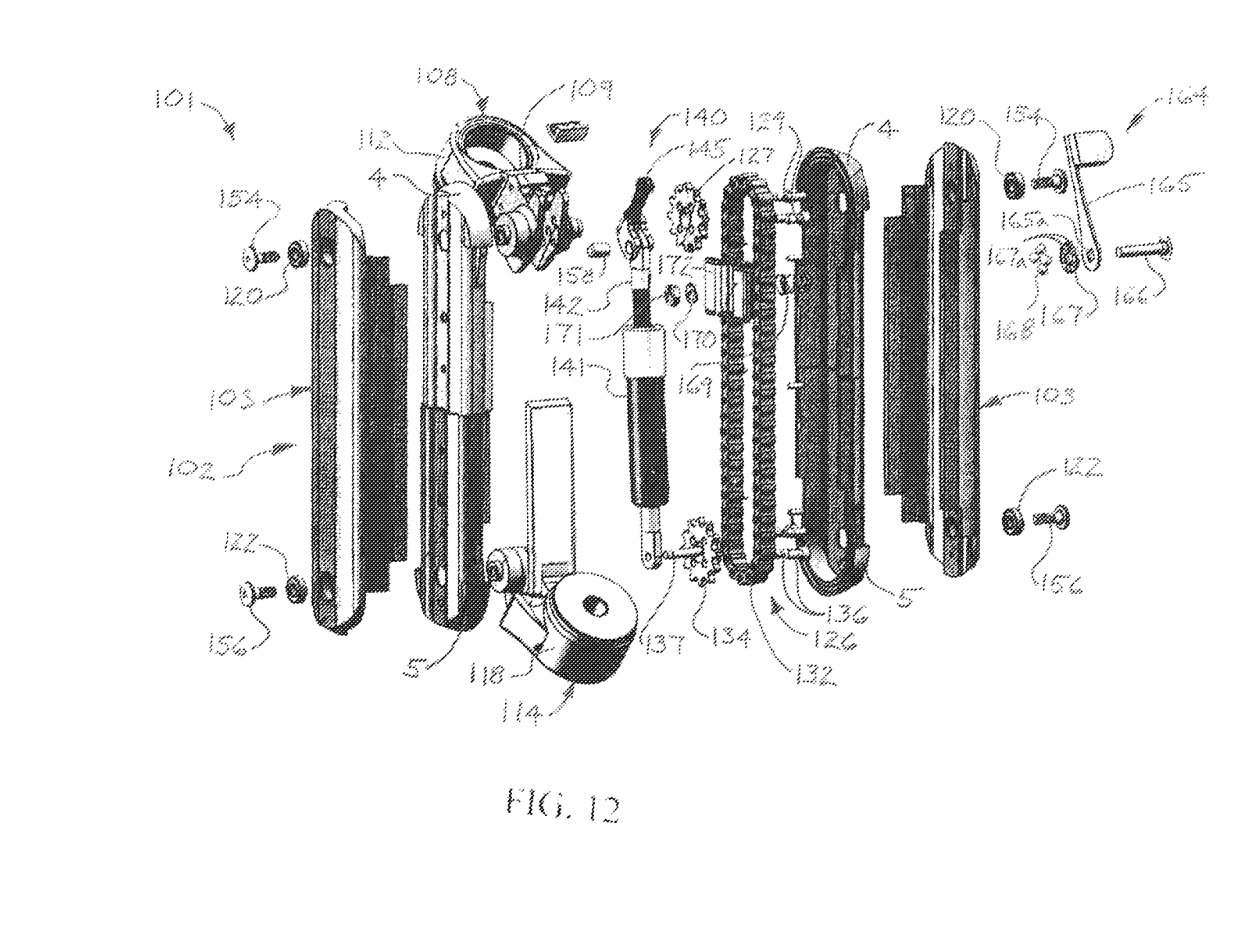
FIG. 12 is an exploded perspective view of an alternative illustrative embodiment of the support arm.

Referring next to FIG. 12 of the drawings, an alternative illustrative embodiment of the support arm is generally indicated by reference numeral 101. In the support arm 101, elements which are analogous to the respective elements of the support arm 1 that was heretofore described with respect to FIGS. 1-11 are designated by the same numeral in the 101-199 series. The support arm 101 may include a brake assembly 164 which allows the support arm 101 to be secured in place at any point along its 180 degrees of travel (FIG. 9). The brake assembly 164 prevents the support arm 1 from creeping up or down once the desired position of the support arm 1 has been achieved. The brake assembly 164 may also allow the support arm 1 to support more weight than the gas spring cylinder 141 can counterbalance by locking the chain 132 of the position equalizing assembly 126 in place and taking the weight load off the gas spring cylinder 141.

The brake assembly 164 may include a brake lever 165. A carriage bolt 166 may extend through a bolt opening 165a in the brake lever 165 and through a registering cam washer 167 and bolt openings (not illustrated) in a housing portion 103, a proximal end cap 4 and a brake pad 172, respectively. The brake pad 172 may engage the chain 132 of the position equalizing assembly 126. A washer 170 and a nut 171 may be keyed to the brake pad 172. The carriage bolt 166 threadably engages the nut 171. A brake pad return spring 169 may be sandwiched between the proximal end cap 4 and the brake pad 172.

Ball bearings 168 are pressed into the exterior surface of the housing portion 103. The cam washer 167 has multiple spiral tracks 167a which ride on the respective ball bearings 168. As the brake lever 165 is turned in a first direction, the cam washer 167 rides up the ball bearings 168 and pulls outwardly on the carriage bolt 166, which exerts outward pressure on the nut 171. In turn, the nut 171 presses outwardly against the brake pad 172, which presses the chain 132 against the proximal end cap 4. Therefore, the chain 132 is incapable of rotating on the proximal sprocket 127 and the distal sprocket 134, preventing pivoting of the support arm 1. Upon release of the brake lever 165 by rotation of the brake lever 165 in a second direction, the cam washer 167 rides down the ball bearings 168 and pulls the carriage bolt 166 inwardly. The brake pad return spring 169 biases the brake pad 172 to the original position such that the brake pad 172 disengages the chain 132, facilitating pivoting of the support arm 1.

In some embodiments of the brake assembly 164, 4 ball bearings 168 may be used. The cam washer 167 may include detents to control or confine the total rotation of the brake lever 165 to a selected arc such as 1/8th turn, for example and without limitation. It will be appreciated by those skilled in the art that the brake assembly 164 can be deployed either off or on and therefore, cannot be left partially on and cause premature wear. In the "on" position of the brake assembly 164, the magnitude of drag may be set at the factory to eliminate over- or under-tightening of the brake assembly 164. The brake pad 172 may clamp over three links of the chain 132 and may column-loads the chain pivot pins, imparting a consistent and smooth lock on the chain 132 at any point along the chain 132.

While illustrative embodiments of the disclosure have been described above, it will be recognized and understood that various modifications can be made and the appended claims are intended to cover all such modifications which may fall within the spirit and scope of the disclosure.

What is claimed is:

1. A support arm mounted on a support structure for supporting an electronic device, comprising:
  a generally elongated support arm housing having first and second ends; at least one proximal ball bearing assembly and at least one distal ball bearing assembly carried by the support arm housing;
  at least one proximal housing shoulder bolt and at least one distal housing shoulder bolt carried by the at least one proximal ball bearing assembly and the at least one distal ball bearing assembly, respectively;
  an arm mounting member pivotally carried by the at least one proximal housing shoulder bolt at the first end of the support arm housing, the arm mounting member pivotal throughout a first range of rotation, the arm mounting member including an arm mounting member wall outside the support arm housing, the arm mounting member wall forms an arm mounting member interior, and an arm mounting member bottom panel closing the arm mounting member interior, the arm mounting member interior open opposite the arm mounting member bottom panel;
  a device mounting member pivotally carried by the at least one distal housing shoulder bolt at the second end of the support arm housing, the device mounting member pivotal throughout a second range of rotation, the device mounting member
  including a device mounting member wall outside the support arm housing, the device mounting member wall forms a device mounting member interior, and a device mounting member top panel closing the device mounting member interior, the device mounting member interior open opposite the device mounting member bottom panel;
  a position equalizing assembly engaging the arm mounting member and the device mounting member, the position equalizing assembly pivoting the arm mounting member and the device mounting member in opposite directions throughout the first range of rotation and the second range of rotation; and
  a counterbalance adjusting assembly carried by the arm mounting member and engaging the device mounting member, the counterbalance adjusting assembly applying counterbalance force to the device mounting member.

2. The support arm of claim 1 wherein the support arm housing comprises a pair of mating housing portions.

3. The support arm of claim 1 wherein the arm mounting member comprises a mounting member arm carried by the at least one proximal housing shoulder bolt.

4. The support arm of claim 3 further comprising a mounting member bottom panel opening extending through the mounting member bottom panel.

5. The support arm of claim 1 wherein the device mounting member comprises a mounting member arm carried by the at least one distal housing shoulder bolt and the mounting member wall is carried by the mounting member arm.

6. A support arm mounted on a support structure for supporting an electronic device, comprising:
   a generally elongated support arm housing having first and second ends; at least one proximal ball bearing assembly and at least one distal ball bearing assembly carried by the support arm housing;
   at least one proximal housing shoulder bolt and at least one distal housing shoulder bolt carried by the at least one proximal ball bearing assembly and the at least one distal ball bearing assembly, respectively;
   an arm mounting member pivotally carried by the at least one proximal housing shoulder bolt at the first end of the support arm housing, the arm mounting member pivotal throughout a first range of rotation, the arm mounting member including
   an arm mounting member wall outside the support arm housing, the arm mounting member wall forms an arm mounting member interior, and an arm mounting member bottom panel closing the arm mounting member interior, the arm mounting member interior open opposite the arm mounting member bottom panel;
   a device mounting member pivotally carried by the at least one distal housing shoulder bolt at the second end of the support arm housing, the device mounting member pivotal throughout a second range of rotation, the device mounting member including a device mounting member wall outside the support arm housing, the device mounting member wall forms a device mounting member interior, and a device mounting member top panel closing the device mounting member interior, the device mounting member interior open opposite the device mounting member bottom panel;
   the arm mounting member and the device mounting member are positional throughout a 180-degree arc at the first end and the second end, respectively, of the support arm housing;
   a position equalizing assembly including:
   a first sprocket engaging the arm mounting member; a second sprocket engaging the device mounting member; and a chain engaging the first sprocket and the second sprocket, the position equalizing assembly adapted to pivot the arm mounting member and the device mounting member in opposite directions throughout the first range of rotation and the second range of rotation;
   a counterbalance adjusting assembly carried by the arm mounting member and engaging the device mounting member, the counterbalance adjusting assembly applying counterbalance force to the device mounting member.

7. The support arm of claim 6 wherein the support arm housing comprises a pair of mating housing portions.

8. The support arm of claim 6 wherein the arm mounting member comprises a mounting member arm carried by the at least one proximal housing shoulder bolt and the mounting member wall is carried by the mounting member arm.

9. The support arm of claim 8 further comprising a mounting member bottom panel opening extending through the mounting member bottom panel.

10. The support arm of claim 6 wherein the device mounting member comprises a mounting member arm carried by the at least one distal housing shoulder bolt and the mounting member wall is carried by the mounting member arm.

11. A support arm mounted on a support structure for supporting an electronic device, comprising:
    a generally elongated support arm housing having first and second ends; at least one proximal ball bearing assembly and at least one distal ball bearing assembly carried by the support arm housing;
    a pair of proximal housing bolts and a pair of distal housing bolts carried by the support arm housing;
    a pivoting arm mounting member carried by the proximal housing bolts, the arm mounting member pivotal throughout a first range of rotation, the arm mounting member including an arm mounting member wall outside the support arm housing, the arm mounting member wall forms an arm mounting member interior, and an arm mounting member bottom panel closing the arm mounting member interior, the arm mounting member interior open opposite the arm mounting member bottom panel;
    a pivoting device mounting member carried by the distal housing bolts, the device mounting member pivotal throughout a second range of rotation, the device mounting member including a device mounting member wall outside the support arm housing, the device mounting member wall forms a device mounting member interior and a device mounting member top panel closing the device mounting member interior, the device mounting member interior open opposite the device mounting member bottom panel;
    the arm mounting member and the device mounting member are positional throughout a 180-degree arc at the first end and the second end, respectively, of the support arm housing;
    a position equalizing assembly engaging the arm mounting member and the device mounting member, the position equalizing assembly pivoting the arm mounting member and the device mounting member in opposite directions throughout the first range of rotation and the second range of rotation; and
    a plane of the arm mounting member remains in parallel relationship to a plane of the device mounting member as the arm mounting member and the device mounting member are pivoted throughout their respective ranges of movement on the first and second ends, respectively, of the support arm housing;
    a counterbalance adjusting assembly including:
    a gas spring cylinder engaging the device mounting member; a piston extending from the gas spring cylinder; an assembly adjusting mechanism carried by the arm mounting member and engaging the piston, the assembly adjusting mechanism operable to apply counterbalance force of selected magnitude to the device mounting member through the piston and the gas spring cylinder.

12. The support arm of claim 11 wherein the assembly adjusting mechanism comprises a threaded lead screw carried by the arm mounting member, a clevis nut threadably engaging the lead screw and a clevis carried by the clevis nut, and wherein the piston pivotally engages the clevis.

13. The support arm of claim 11 wherein the position equalizing assembly comprises a first sprocket engaging the arm mounting member, a second sprocket engaging the device mounting member and a chain engaging the first sprocket and the second sprocket, the position equalizing assembly adapted to pivot the arm mounting member and the device mounting member in opposite directions throughout the first range of rotation and the second range of rotation.

* * * * *